(No Model.)

O. J. IRISH.
Horseshoe.

No. 242,452. Patented June 7, 1881.

Witnesses.
Henry Frank/hunter
B. M. Morse per:

Inventor,
Owen J. Irish
Jas A Cowles
Attorney.

United States Patent Office.

OWEN J. IRISH, OF RACINE, WISCONSIN.

HORSESHOE.

SPECIFICATION forming part of Letters Patent No. 242,452, dated June 7, 1881.

Application filed February 14, 1881. (No model.)

*To all whom it may concern:*

Be it known that I, OWEN J. IRISH, of the city of Racine, in the county of Racine, in the State of Wisconsin, have invented a new and useful Improvement in Horseshoes, of which the following is the specification, reference being had to the accompanying drawings, forming a part of this specification.

The nature and object of this invention is to construct a horseshoe that will adapt itself to the growth and expansion of a horse's hoof while it is being worn.

Figure 1:
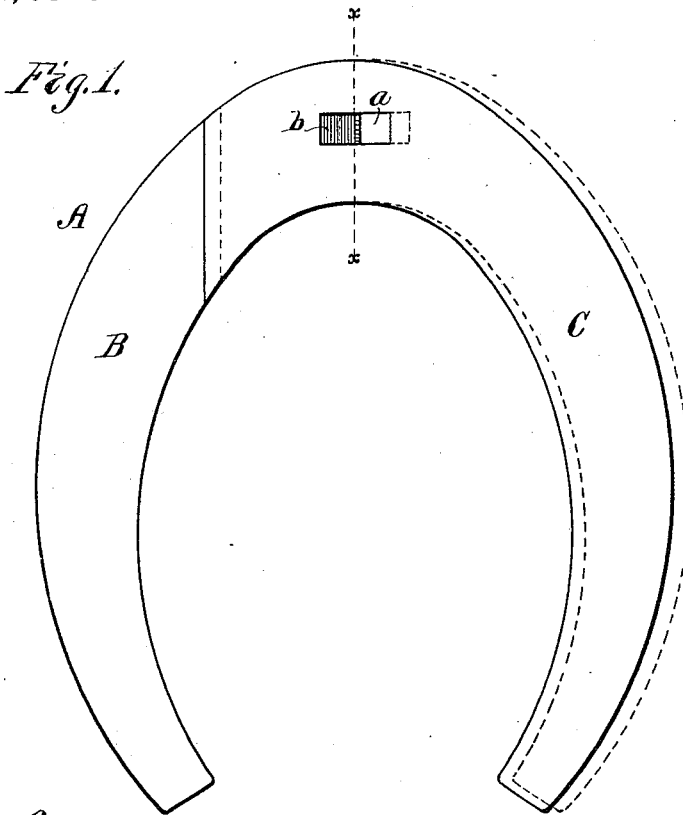
Figure 2:
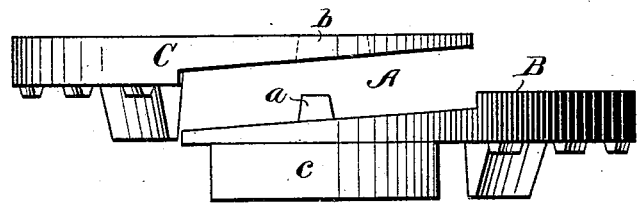
Figure 3:
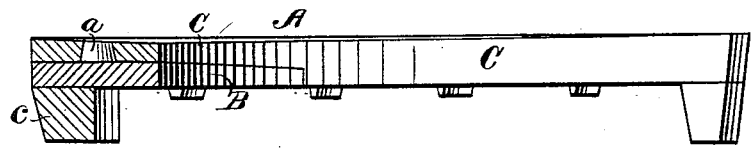

Figure 1 is a top view. Fig. 2 is a front view of the two parts forming the shoe, separated to show the peculiar construction; and Fig. 3 is a sectional view taken through the line *x x*, Fig. 1.

Similar letters of reference refer to similar parts in the different drawings.

A is the horseshoe, the heavy lines showing the shoe in position before any expansion has taken place. The dotted lines in Fig. 1 show the shoe after it has expanded by the growth or spread of the horse's hoof.

The shoe is made in two parts, one piece overlapping the other over the toe-cork, as shown in Fig. 2. At the center of the overlap, in the lower part, and to which the toe-cork is attached, is the pin *a*, fastened to the lower lap, and extending up through the upper lap through the slot *b*, (shown in Fig. 1.) The slot *b* is made elongated, so as to admit of the side movement of the two pieces of the shoe as they are expanded by the hoof. The slot *b* can be made curving, if desired.

The two pieces of the shoe move laterally directly, and not around a pivot, as is the case when the two parts are united by a pivot only.

The pin *a* is flush with the top of the slot *b* in the upper lap *c*, as may be seen in Fig. 3.

The use of this shoe on a diseased hoof or on a growing hoof enables it to expand freely and without pain to the horse, as the shoe at both the heel and toe adapts itself to the growth of the hoof.

It is a well-known fact that iron is expanded and contracted by heat and cold, and in the case of a horseshoe as heretofore used there was no provision for this expansion and contraction when the shoe was firmly fastened to the hoof. By this construction, it will be seen, ample provision is made for the expansion and contraction, when the shoe is fastened to the hoof, without pain or detriment to the animal, thus compensating at all times for the heat and cold. The hoof of the horse is acted upon by the temperature in the same manner, and is compensated for by the construction of the within-described shoe.

It will be observed that the pin *a* is made slightly pyramidal, thus making the top smaller than the base, and is flush with the top of the upper lap of the joining ends of the shoe.

I am aware that horseshoes have been made in such a manner as to admit of an expansion; but they are differently constructed and operate on a different principle from the improvement herein described. Furthermore, it is not a supplemental shoe, but is to be attached directly to the hoof. It is made in two parts, separated at the toe, with overlapping ends, with no features over the ordinary shoe to give it additional weight or to make it cumbersome and unwieldy. It has no means—such as nut and screw—to force an expansion, but leaves the hoof to expand according to its natural tendency without pain to the animal.

Having thus described my invention, what I claim is—

As an article of manufacture, a horseshoe to be attached directly to the hoof, made in two parts, separated at the toe with overlapping ends, having in the upper lap a slot, and attached to the lower lap a pin extending up through the slot and flush with upper surface thereof, the two parts forming a complete and light shoe which admits of the free expansion of the hoof, as described, and for the purpose shown.

OWEN J. IRISH.

Witnesses:
 HENRY LAWRENCE,
 Dr. A. M. RIERNBURGH.